United States Patent [19]

Kinoshita et al.

[11] Patent Number: 4,683,177
[45] Date of Patent: Jul. 28, 1987

[54] POWER GENERATION SYSTEM IN FUEL CELL

[75] Inventors: Tomohiro Kinoshita; Seiichi Tanabe; Eishiro Sasakawa, all of Tokyo, Japan

[73] Assignee: Mitsubishi Jukogyo Kabushiki Kaisha, Tokyo, Japan

[21] Appl. No.: 889,492

[22] Filed: Jul. 25, 1986

[30] Foreign Application Priority Data

Aug. 16, 1985 [JP] Japan ................................ 60-179330

[51] Int. Cl.$^4$ ............................................ H01M 8/06
[52] U.S. Cl. ........................................ 429/26; 429/17; 429/19
[58] Field of Search ............................ 429/26, 17, 19

[56] References Cited

U.S. PATENT DOCUMENTS

| 3,576,677 | 4/1971 | Keating et al. | 429/26 |
| 4,041,210 | 8/1977 | Van Dine | 429/17 |
| 4,080,487 | 3/1978 | Reiser | 429/26 |
| 4,622,275 | 11/1986 | Noguchi et al. | 429/26 |

Primary Examiner—Donald L. Walton
Attorney, Agent, or Firm—Birch, Stewart, Kolasch & Birch

[57] ABSTRACT

A power generation system in a fuel cell having an air preheater for preheating air for a fuel cell reaction which will be fed to an afterburner of a high-temperature solid electrolyte type fuel cell, characterized by disposing, between the air preheater and the afterburner, a combustor for performing an additional combustion after the temperature of the air for the reaction has been elevated by the air preheater.

1 Claim, 2 Drawing Figures

POWER GENERATION SYSTEM IN FUEL CELL

BACKGROUND OF THE INVENTION (1) Field of the Invention

The present invention relates to a power generation system in a fuel cell which is applicable as a power generation system in which the main power generation system is a high-temperature solid electrolyte type fuel cell having a preheater for air used in a fuel cell reaction.

(2) Description of the Prior Art

FIG. 1 shows the constitution of a conventional power generation system in a fuel cell, wherein reference numeral 1 is a high-temperature solid electrolyte type fuel cell, numeral 3 is an air preheater, 4 is a waste heat recovery boiler, 5 is an economizer, 6 is a portion in which a high-temperature exhaust gas for a bottoming cycle is recovered, 7 is an afterburner, 8 is a preheater for a fuel gas, 9 is a fuel gas, and 10 is air for a fuel cell reaction.

An operative temperature of the high-temperature solid electrolyte type fuel cell 1 in the above mentioned fuel cell system is as high as about 1,000° C., and the air 10 for the reaction also has the role of cooling the fuel cell. Consequently, a tremendous amount of reaction air having the high temperature is required (see Takehiko Takahashi, "Fuel Cell", Kyoritsu Shuppan, 1984, April, p. 123).

In the power generation system in the fuel cell just described, a high-temperature and high-flow rate type mechanism is required to preheat air 10 for the reaction which will be fed to high-temperature solid electrolyte type fuel cell 1. However, in the case that the preheating is carried out by means of afterburner 7 as in FIG. 1, it is necessary to dispose large-scale afterburner 7, so that the pressure loss of the latter tends to increase. In addition, installation of such a large afterburner is inconvenient from the viewpoint of economy.

New heat exchangers which are made from ceramic materials and which make use of heat pipes have been developed, but at present, such are still technically unsatisfactory.

SUMMARY OF THE INVENTION

The present invention contemplates overcoming the problems of the above mentioned power generation system in a fuel cell. An object of the present invention is to provide a power generation system in the fuel cell in which a combustor is disposed between air preheater and an afterburner to perform an additional combustion and to thereby provide high-temperature air. According to the thus constituted power generation system, the compact structure of the afterburner and the decrease in pressure loss can be achieved, the reduction in the cost can also be expected, and the exhaust gas from the afterburner can have a high temperature in order to increase a bottoming output.

The present invention is directed to a power generation system in a fuel cell having an air preheater for preheating air for a fuel cell reaction which will be fed to an afterburner of a high-temperature solid electrolyte type fuel cell, characterized by disposing between the air preheater and the afterburner, a combustor for performing additional combustion after the temperature of the air for the reaction has been elevated by the air preheater. Therefore, for example, the air for the reaction which has been raised up to a temperature of 200° to 300° C. or so by the air preheater is additionally heated by the combustor, before being introduced into the afterburner. As a result, the air is elevated thereby up to a level of 600° C. or more, and is then fed to the afterburner, in which the air is further elevated up to about 1,000° C.

According to the present invention, the combustor is disposed between the air preheater and the afterburner, whereby the afterburner can be remarkably compacted and the pressure loss can be reduced. Moreover, since the temperature of the exhaust gas from the afterburner is high (owing to the extra heat generated in the afterburner), the output on the bottoming side is increased, which results in a heightening of the output of the whole plant and a lowering of the construction cost of the plant. In addition thereto, the flow rate of the air for the reaction is very high, and thus a change in the composition, which is attributable to the disposition of the combustor, is very small and minor.

DESCRIPTION OF THE PREFERRED EMBODIMENTS

Figure 1:
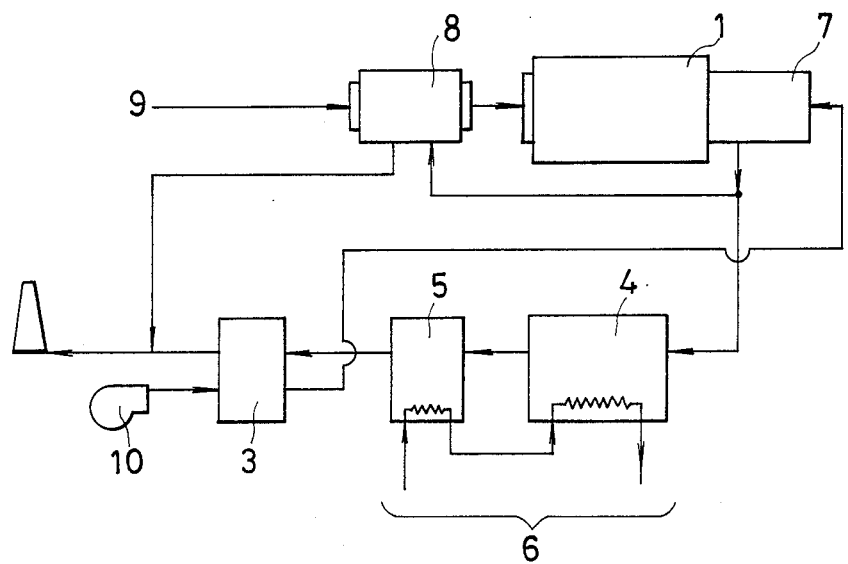
FIG. 1 shows a constitutional embodiment of a conventional power generation system in a fuel cell.
Figure 2:
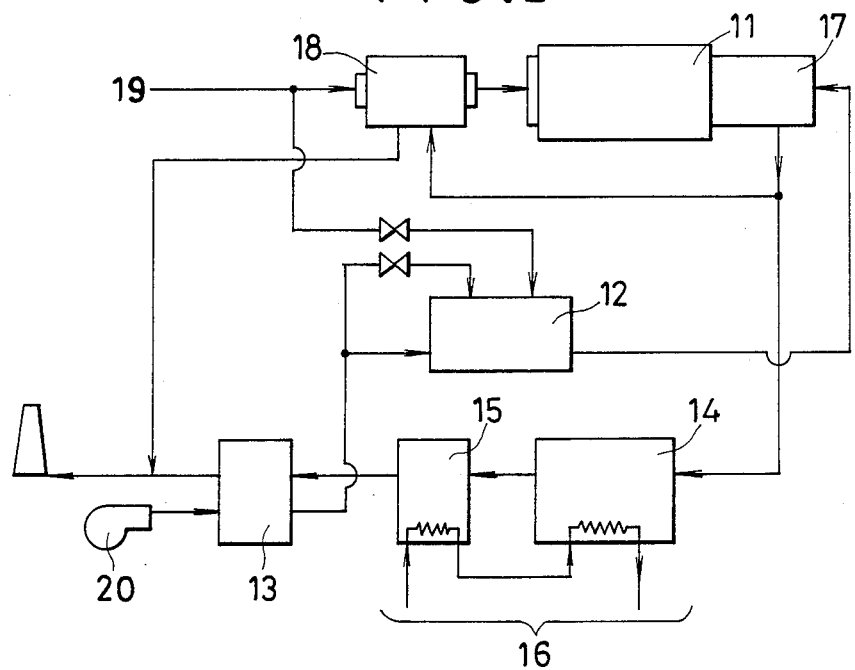
FIG. 2 shows one embodiment of the present invention.

In FIG. 2, reference numeral 11 is a high-temperature solid electrolyte type fuel cell, numeral 13 is an air preheater, 14 is a boiler for recovering waste heat, 15 is an economizer, 16 is a portion in which a high-temperature exhaust gas for a bottoming cycle is recovered, 17 is an afterburner, 18 is a preheater for a fuel gas, 19 is a fuel gas, and 20 is air for a reaction. The constitution and function of the respective members just mentioned are the same as those of the members in FIG. 1.

The difference between the embodiment of the present invention shown in FIG. 2 and the conventional one shown in FIG. 1 is as follows: In FIG. 2, a combustor 12 is disposed between the air preheater 13 and the afterburner 17 so that the air 20 for the reaction heightened in the air preheater 13 may be additionally heated in the combustor 12.

In FIG. 2 regarding the present invention, the temperature of the air 20 for the reaction is raised by means of the air preheater 13, and the air is additionally heated in the combustor 12 and is then further raised by the afterburner 17. The unreacted fuel in the high-temperature solid electrolyte type fuel cell 11 is burned in the afterburner 17 and the heat resulting therefrom is to be used for the preheating of air 20 for the fuel cell reaction. The extra heat energy is recovered in the boiler for recovering waste heat 14 and the economizer 15 for the sake of the bottoming cycle and is simultaneously recovered effectively in air preheater 13.

According to the present invention just described, the following excellent effects can be obtained:

(1) The miniaturization of the afterburner, the reduction in the cost and the increase in the plant output are possible.

(2) Since the combustor is provided between the air preheater and the afterburner so as to include additional combustion and to thereby prepare the high-temperature gas, the load of the afterburner can thus be relieved and the latter can be miniaturized, which permits cost reduction. Further, the bottoming output can also be increased thereby.

What is claimed is:

1. A power generation system in a fuel cell having an air preheater for preheating air for a fuel cell reaction which will be fed to an afterburner of a high-temperature solid electrolyte type fuel cell, characterized by disposing, between said air preheater and said afterburner, a combustor for performing an additional combustion after the temperature of the air for the reaction has been elevated by said air preheater.

* * * * *